United States Patent [19]

Martellock et al.

[11] 4,374,212

[45] Feb. 15, 1983

[54] SHEET HANDLING DEVICE

[75] Inventors: Arthur C. Martellock, Pittsford; Richard L. Carlston; Shwu-Jian Liang, both of Rochester, all of N.Y.

[73] Assignee: Xerox Corporation, Stamford, Conn.

[21] Appl. No.: 288,097

[22] Filed: Jul. 29, 1981

[51] Int. Cl.$^3$ ............................................. C08L 61/06
[52] U.S. Cl. .................................... 523/212; 524/588; 271/10
[58] Field of Search ....................... 523/212; 524/588; 271/10

[56] References Cited

U.S. PATENT DOCUMENTS

| | | | |
|---|---|---|---|
| 2,297,691 | 4/1939 | Carlson | 95/5 |
| 3,469,834 | 4/1967 | Stange et al. | 271/10 |
| 3,482,676 | 1/1968 | Fackler | 198/193 |
| 3,645,615 | 7/1969 | Spear, Jr. | 355/3 |
| 3,738,859 | 2/1970 | Anderson et al. | 117/76 J |
| 3,768,803 | 2/1972 | Stange | 271/34 |
| 3,847,848 | 11/1974 | Beers | 260/185 |
| 3,931,090 | 4/1974 | Amatangelo | 260/23.7 M |
| 3,949,979 | 9/1974 | Taylor et al. | 271/10 |
| 4,019,941 | 2/1975 | Prince et al. | 156/179 |
| 4,192,497 | 2/1977 | Perun et al. | 65/52 |

*Primary Examiner*—Melvyn I. Marquis

[57] ABSTRACT

A sheet handling device for use in an electrostatographic copying machine in which a sheet is conveyed by frictional engagement with a sheet handling member, with at least the surface of the sheet handling member being made with a moldmaking silicone rubber composition which includes a diorganopolysiloxane, an organosilicate, and a curing catalyst, together with a silica filler treated with a mixture of a hydroxyl amine, a cyclic siloxane, and a silyl nitrogen compound.

7 Claims, 3 Drawing Figures

SHEET HANDLING DEVICE

BACKGROUND OF THE INVENTION AND PRIOR ART STATEMENT

This invention relates to a sheet handling device such as a sheet separating and feeding device, and more particularly to a sheet separating and feeding device suitable for use in an electrostatographic copying machine.

In the electrostatographic copying process, as originally disclosed in Carlson U.S. Pat. No. 2,297,691, a photoconductive insulating surface is electrostatically and uniformly charged, and exposed to a light pattern of the original to be reproduced to form a latent electrostatic image on the surface. The latent image is then developed by contacting the image areas with finely divided electrostatically attractive materials known as toner particles. The developed image is generally transferred to a final support material, such as a sheet of paper, and affixed thereto to form a permanent copy of the original.

Since the disclosure of this basic concept by Carlson, a variety of automatic copying machines and devices have been proposed and commercialized. Some of these machines and devices, including sheet feeding and transporting apparatus, are disclosed in the prior art. These prior art patents, as well as other patents relating to conveyor beltings, etc., will be now briefly described.

In Stange et al U.S. Pat. No. 3,469,834, there is disclosed a sheet feeder and separator apparatus in which a friction drive wheel engages the top sheet of a stack to advance the sheet between a stationary retard roll or abutment member and a moving belt member. The belt member is formed of a material having a high coefficient of friction, while a friction member is formed of a resilient material having a lower coefficient of friction and is mounted on the retard roll or abutment member and engageable with the belt member.

in Fackler U.S. Pat. No. 3,482,676, there is disclosed a document transport belt having an outer layer of a flexible light reflective material such as white rubber, and an inner layer of flexible electrically conductive material such as graphite impregnated rubber.

In Spear U.S. Pat. No. 3,645,615, there is disclosed a copying apparatus which is capable of being selectively operated to produce simplex image of an original document, or to produce duplexed image according to a second mode of operation in which the simplexed sheets are automatically delivered to a second supply tray for refeeding through the copying processing stations. In the duplex mode of operation, simplexed sheets are forwarded to an upper supply tray shown in FIG. 3 of this patent. The driven feed rollers in this upper supply tray are then in contact with the imaged side of the simplexed sheet when feeding the simplexed sheet through the copying apparatus for the duplexed image on the reverse side of the sheet.

In Anderson et al U.S. Pat. No. 3,738,859, there is disclosed a fire resistent conveyor beltings for underground mining operations, which is made of a textile carcass impregnated with polyvinyl chloride (PVC), an inner layer of PVC or other thermoplastic material, and an outer layer of natural or synthetic rubber such as butadiene-acrylonitrile copolymer rubber. The rubber compound is so formulated that under frictional heat, a differential softening occurs at the PVC/textile interface causing the rubber layers to be detached.

In Stange U.S. Pat. No. 3,768,803, there is disclosed a sheet feeder made of a feeder belt in contact with a stack of sheets and a retard member. The feed belt has a layer of natural rubber on top, a rayon cord layer, and a tracking member made of an elastic material such as neoprene. The retard member has a pad thereon made of a resilient material. The feeder belt and retard member together form a throat in which the sheets are separated.

In Amatangelo U.S. Pat. No. 3,931,090, there is disclosed a highly reversion resistant polyisoprene elastomer composition vulcanized with a low sulphur content for use in paper feed belts The low sulphur vulcanizate of isoprene provides high resistant to physical degradation due to dynamic mechanical stress under operating conditions.

In Taylor et al U.S. Pat. No. 3,949,979, there is disclosed a sheet feeding apparatus having a belt and retard pad, with the retard pad pivoted about a pin so that the nip force is reduced when one attempts to remove a sheet in the reverse direction but the nip force is increased when the apparatus is feeding sheets in the feeding direction.

In Prince et al U.S. Pat. No. 4,019,941, there is disclosed a method of constructing conveyor belting by placing steel reinforcing cords in groves formed between the mating faces of layers of PVC based material.

Finally, in Perun et al U.S. Pat. No. 4,192,497, there is disclosed a composition for the surface of sheet separating devices, which comprises microcellular elastomeric material having a hardness of at least 25 durometer. Examples of microcellular elastomers include PVC, polyurethanes, styrene/acrylonitrile, and polyethylene. Certain disadvantages of silicone rubber retard roll and conventional polyurethane are briefly discussed (column 6, lines 5–16).

Although the sheet separating and feeding devices of the prior art have provided satisfactory services, there is a need for improved sheet feeding devices for use in electrostatographic copying machines. In particular, there is a need for improved sheet feeding devices which have stable and high coefficients of friction for dependable separation and feeding of sheets of paper; high resistance to air oxidation and ozone attack; and improved frictional properties when used in the duplex mode and in contact with sheets of paper having toner particles and silicone oil thereon; etc. As used herein, the terms "sheet feeding device" and "sheet separating and feeding device" are intended to refer to the same thing: that is, a device that will first separate a sheet from a stack and then feed that separated sheet to further processing stations. See, e.g., said U.S. Pat. No. 3,768,803 and FIG. 1 herein below.

It is, therefore, an object of the present invention to provide an improved sheet feeding device or sheet handling device for use in electrostatographic copying machines.

It is another object of the present invention to provide an improved sheet feeding device in which at least the functional surface of a feeding member has improved frictional stability.

These and other object of the invention will be apparent from the following disclosure.

SUMMARY OF THE INVENTION

The above objects are accomplished in accordance with the present invention by a sheet feeding device in which a sheet is fed by frictional engagement with a feeding member, and in which at least the functional surface of the feeding member is made of a room temperature vulcanizable silicone rubber composition containing a diorganopolysiloxane together with a treated filler, an organosilicate as a cross-linking agent, and a curing catalyst, said treated filler being a silica filler treated with a mixture of a hydroxyl amine, a cyclic siloxane, and a silyl nitrogen compound. The present invention is also generally applicable to sheet handling devices.

BRIEF DESCRIPTION OF THE DRAWINGS

In the accompanying drawings.

DETAILED DESCRIPTION OF THE INVENTION

Figure 1:
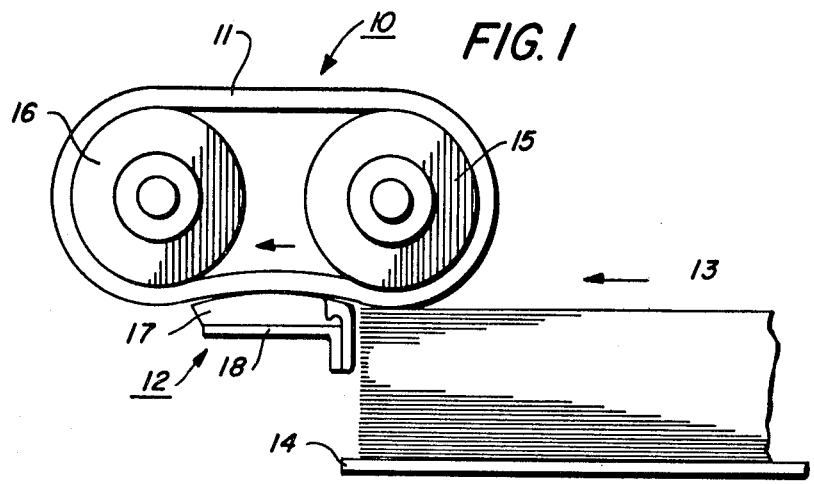
FIG. 1 is a side elevation view of one embodiment of a sheet feeding apparatus employing the sheet feeding member of the present invention.
Figure 2:
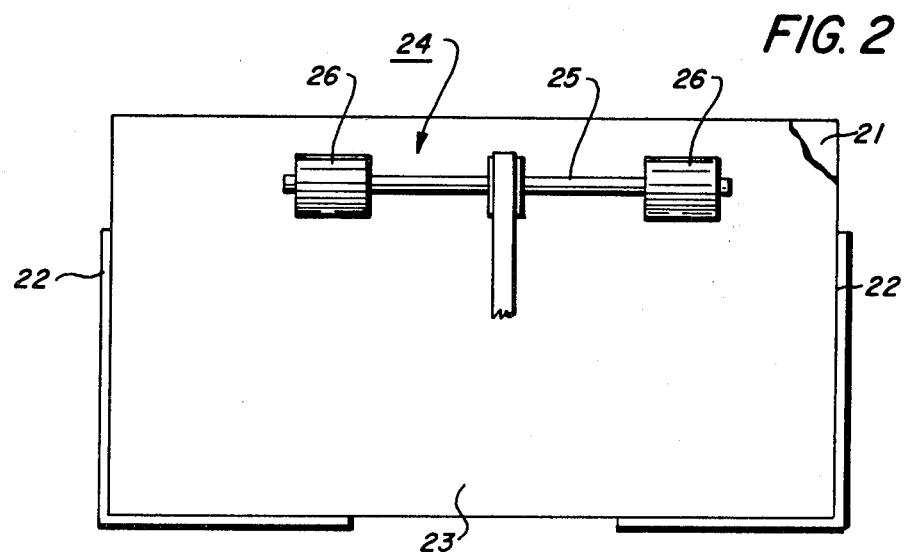
FIG. 2 is a partial plan view showing another embodiment of the sheet feeding member in use in a sheet supply tray.

The sheet feeding member of the present invention may be embodied in several mechanical arrangements which are known in the art. Thus, FIG. 1 illustrates a sheet feeding belt in use with a retard means for feeding sheets. FIG. 2 illustrates another arrangement in which another sheet feeding member in accordance with the present invention is employed to feed sheets on a supply tray. Other configurations of the sheet feeding member of the invention, as well as the mechanical environment in which they are used, are also known. For example, the sheet feeding member of the present invention may be formed in the shape of a paddle wheel for feeding sheets. In addition, the present invention is also generally applicable to sheet handling devices, such as sheet transporting devices, etc.

Referring to FIG. 1, the sheet feeding apparatus 10 is composed of a sheet feeding belt 11 mounted on rollers 15 and 16 and driven by drive means (not shown) in the direction indicated by the arrow. A retard means 12 is shown to be composed of a retard pad 17 mounted on a support plate 18. A stack 13 of the sheets to be individually fed by the sheet feeding apparatus 10 is shown supported on a tray 14 and bearing against the sheet feeding belt 11. Both the surface of sheet feeding belt 11 contacting the sheets and the surface of the retard pad 17 have relatively high coefficients of friction as compared to the coefficient of friction between two of the sheets to be fed. The general operation of such a sheet feeding apparatus is more fully disclosed and said U.S. Pat. No. 3,768,803.

As indicated above, it is important that the coefficient of friction between the surface of sheet feeding belt 11 and a sheet, as well as the coefficient of friction between the retard pad 17 and a sheet, be higher than the coefficient of friction between two sheets. It is further important that, in the configuration shown in FIG. 1, the coefficient of friction between sheet feeding belt 11 and a sheet be higher than the coefficient of friction between the retard pad 17 and a sheet, and this difference in the coefficients of friction ("delta") must be maintained during successive sheet feeding operations so that the sheets will be properly fed by the sheet feeding apparatus. This "delta" in coefficients of friction should generally be maintained in any particular mechanical device. Thus, ideally the sheet feeding belt 11 and the retard pad 17 should be made of materials which not only have high coefficients of friction, and the proper relative coefficients of friction to yield the desired "delta", but the materials should also maintain their coefficients of friction through many sheet feeding operations. However, real materials which can be used for making sheet feeding belt 11 and retard pad 17 all will show drops in coefficients of friction after extended use, for example after 10,000 or 100,000 sheets have been fed. The major causes of such drop in the coefficient of friction are believed to include; degradation of the material used in making the sheet feeding members such as due to ozone and air attack, UV radiation aging, blooming or migration of antioxidants and other additives to the surface of the sheet feeding members, etc,; the contamination of the surface of the sheet feeding member by debris from the paper, such as paper fibers and the sizing material or other chemicals used in the manufacture of the paper; debris on the sheet to be fed from prior operations such as from a typewriter ribbon; and, in the case of a sheet feeding apparatus used in feeding sheets in the duplex mode, contamination of the surface of the sheet feeding member by debris due to the freshly fused simplex image, which may include toner and carrier particles as well as fuser oil used for release purposes. Since it is not possible by the choice of materials to eliminate drops in coefficients of friction of sheet feeding member, it is important that the drop in coefficients of friction be as small as possible while maintaining the delta. Surprisingly, the applicants have found that a new class of silicone rubbers used in moldmaking are extremely suited for use as the sheet feeding member. These moldmaking silicone rubbers are room temperature vulcanizable compositions comprising a diorganopolysiloxane, an organosilicate, a curing catalyst, and a silica filler treated with a mixture of a hydroxyl amine, a cyclic siloxane, and a silyl nitrogen compound. Such room temperature vulcanizable silicone rubber compositions are disclosed in U.S. Pat. No. 3,847,848. A specific example of such a moldmaking silicone rubber is available from the General Electric Company under its trade designation RTV-700.

Heretofore, polysiloxanes are known for their release values, which is quite different from frictional values. Thus, silicone oils have been used as the release agents in fusing applications, and silicone rubbers have been used as the fuser roll covering materials. Other disadvantages which have prevented the use of silicone rubbers generally as sheet feeding members have been noted in the prior art. See, for example, said U.S. Pat. No. 4,192,497, at column 6, lines 5–16. Suprisingly, we have found that a new class of moldmaking silicone rubbers, as exemplified by RTV-700, are extremely suited for the purposes of sheet feeding members. These moldmaking silicone rubbers not only have high coefficients of friction with respect to paper, but they maintain their coefficients of friction much better than other known materials after many sheet feeding operations, particularly when they are used in duplex mode of operation requiring contact with sheets having silicone oil and/or toner particles and other debris thereon.

Aside from maintaining the frictional values better than prior art devices in the face of contamination by silicone oil or toner particles and other debris which may be present on the surface of the sheets to be handled, the sheet handling members of the present invention also possess other upstanding advantages over the devices of the prior art. For example, the moldmaking silicone rubber compositions employed herein are known for their resistance to ozone attack. On the other hand, polyisoprene is subject to attack by ozone, and a paper handling device made of polyisoprene must contain antiozonant to retard the ozone attack. The antiozonant in the polyisoprene formulation, after being made into a feed belt or other devices, tends to gradually migrate towards the surface of the belt. Such migration assists in the retardation of ozone attack, but the presence of such antiozonant at or near the surface of a polyisoprene belt alters the frictional and other mechanical characteristics of the belt so that proper paper handling is only obtained with relatively frequent cleaning of such polyisoprene belts. This problem is sometimes referred to as blooming. Another problem with prior art paper handling devices is their degradation due to exposure to UV radiation. For example, the coefficient of friction for polyisoprene belts tends to drastically degrade within a few months after continuous exposure to fluorescent light which contains a small amount of UV radiation, whereas the paper feed belts made of the moldmaking silicone rubber compositions herein are essentially uneffected by exposure to UV radiation. The prior art paper handling devices also tend to age by storage at moderately elevated temperatures. In sum, these susceptibility to attacks by environmental elements and changes in surface characteristics caused by migration of additives in the formulations all contribute to a relatively short shelf life for the devices of the prior art. For example, polyisoprene feed belts typically have a shelf life of six to twelve months, depending on the method of packaging and storage. On the other hand, the paper handling devices made of the mold making silicone rubber compositions herein are believed to have shelf life about ten times or greater than that of the polyisoprene feed belts, based on the presently available data. In this respect, it may be pointed out that when new copying machines having polyisoprene feed belts therein are installed for operation, frequently the installing technician will change the never-used belt in the machine to one that is known to be relatively freshly made to insure that the belt in the new machine will not be a source of machine malfunction. The feed belts made with room temperature vulcanizable mold making silicone rubber compositions herein will obviate that problem since normal storage will not degrade such feed belts and become a source of machine malfunction.

Referring to FIG. 2, another embodiment of the sheet feeding member of the present invention is shown. In this embodiment, the sheets are located in a supply tray 21 having side and rear walls 22. The sheets 23 are fed by sheet feeding apparatus 24 which comprises sheet feeding rollers 26 mounted on shaft 25. Shaft 25 is driven by drive means (not shown) to rotate the sheet feeding rollers 26, which are in contact with the sheets 23, to thereby sequentially feed the sheets. Such a sheet feeding apparatus is employed, for example, in the copying apparatus disclosed in said U.S. Pat. No. 3,645,615, and particularly illustrated in FIGS. 2 and 3 thereof. In FIG. 2, at least the surface of the sheet feeding rollers 26 is made of the RTV-700 composition. Such a sheet feeding apparatus is particularly useful in a duplex mode of operation, in which sheets 23 in contact with the sheet feeding rollers 26 bears a freshly fused toner image.

Figure 3:
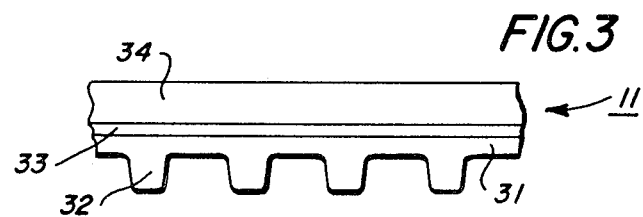
FIG. 3 is a partial cross-sectional view of one embodiment of the sheet feeding member shown in FIG. 1.

FIG. 3 illustrates one embodiment of the construction of the sheet feeding belt 11 of FIG. 1. In FIG. 3, sheet feeding belt 11 is shown in a partial cross-sectional view, as made of a tracking member 31, a layer of a tension member 33 on said tracking member 31, and a layer of the room temperature vulcanizable moldmaking silicone rubber 34 on said tension member. The tracking member 31 may be conveniently made of a material such as treated nylon. Rib portions 32 extending downwardly from the tracking member 31 are shown which are intended to ride on mating grooves in rollers 15 and 16. The tension member 33 may be made of such materials as fiber glass, and it provides stiffness to the sheet feeding belt 11. The layer 34 is made of the RTV-700.

Referring again to FIG. 1, when the sheet feeding apparatus 10 is employed in a simplex mode of operation, the sheet feeding belt 11 may have a surface made of RTV-700, while the retard pad 17 may be made of a material having a relatively lower coefficient of friction to result in the proper "delta". For example, the retard pad 17 may be made of the microcellular elastomer disclosed in said U.S. Pat. No. 4,192,497. It will be appreciated that since RTV-700 is relatively unaffected by contact with freshly fused simplex images, it is advantageous in a duplex mode of operation to arrange to have the sheet feeding member in contact with the imaged side of the sheet to be fed be made of RTV-700 to minimize any drop in coefficient of friction and to maintain the "delta" at the proper level.

It is known that certain silicone rubber compositions are not moldable or are only difficulty moldable into shaped object. In this respect, the present invention provides the use of silicone rubber compositions, such as the RTV-700, which are themselves moldmaking materials and thus can be relatively easily molded into the sheet handling members. However, the present invention also contemplates that sheet handling members made of other materials may be greatly improved by a surface coating of the present silicone rubber composition. Such surface coating may be applied by methods known in the art, for example, by spray coating or dip coating techniques.

The invention will be further described with reference to the following examples. In these examples, the coefficients of friction for different paper feed belts were measured at various times with different apparatus. Accordingly, their absolute values may differ greatly. However, it should be kept in mind that the important comparison for these feed belts and their coefficients of friction are their relative values when tested under the same selected conditions, as well as the degradation of the coefficient of friction due to the contamination of the feed belts.

EXAMPLE I

Paper feed belts made of the moldmaking silicone rubber RTV-700 was molded in the configuration shown in FIG. 3, using a BETA 5 catalyst. In addition to the BETA 5 catalyst, about 0.5 part by weight of stannous octoate was added to 100 parts by weight of the RTV-700 composition to shorten the molding time for the belt. Another belt of similar construction was made, with the exception that the layer of RTV-700 has been replaced by a layer of polyisoprene. The two belts were tested in an apparatus in which the belts were driven at a rate of about 50 inches per minute and at a nominal pressure of 5 PSI (which corresponds to a normal force of about 0.4 pounds). Three different papers were used in the test: paper (a) was a Xerographic Bond made by Scott Paper Company; paper (b) was a standard xerographic paper made by Hammermill; and paper (c) was paper (b) having a simplex xerographic image on the side in contact with the feed belt, the image being made by a xerographic toner applied by a cascade development method and fused onto the paper. In the following tests for uncontaminated friction coefficient, the belts surface was cleaned with methanol then permitted to dry before the test.

| UNCONTAMINATED FRICTION COEFFICIENT | | | |
|---|---|---|---|
| | PAPER | | |
| BELT | a | b | c |
| Polyisoprene | 2.97 | 2.22 | 2.01 |
| RTV-700 | 2.41 | 2.24 | 2.41 |

It can be seen that although the polyisoprene belt had higher coefficient of friction for paper (a) than for RTV-700 belt, the coefficient of friction for polyisoprene degraded drastically when papers of increasing contamination propensities were encountered. On the other hand, the coefficient of friction for the RTV-700 belt stayed essentially constant irrespective of the nature of the paper being fed.

EXAMPLE II

The polyisoprene belt and the RTV-700 belt of Example I were used in a contaminated friction coefficient test. In this test, the two belts were contaminated by slipping their surfaces past about 20 inches of the paper to be tested so that the belt surface would pick up contamination from the paper. The contaminated surface of the feed belts were then tested for coefficient of friction with respect to the three grades of paper used in Example I.

| CONTAMINATED FRICTION COEFFICIENT | | | |
|---|---|---|---|
| | PAPER | | |
| BELT | a | b | c |
| Polyisoprene | 2.54 | 1.82 | 1.64 |
| RTV-700 | 2.39 | 2.08 | 2.03 |

As can be gathered from the above table, the contaminated polyisoprene belt experienced a much more severe drop in coefficient of friction when it is used with papers of increasing contamination propensities, as compared to those values for the RTV-700 belt. This drastic decrease in the coefficient of friction of the polyisoprene belt makes it less suited for use in the feeding of lower grade papers or papers with simplexed images thereon. Moreover, comparison of the data in Examples I and II, as well as other comparative data, show that the drop in coefficient of friction due to the contamination of the feed belt is roughly one half as much for the RTV-700 belt as compared to the polyisoprene belt.

EXAMPLE III

A feed belt constructed essentially as shown in FIG. 3 was made with GE RTV-700 moldmaking silicone rubber using a BETA 1 catalyst. A retard belt was made of a microporous polyurethane material substantially as disclosed in U.S. Pat. No. 4,192,497. These sheet feeding members were used to feed papers in the following manner: first 50,000 sheets fed were all duplex, having an image on the side contacting the RTV-700 belt; the next 60,000 sheets fed were in the sequence of 1,000 simplex/5,000 duplex; the next 90,000 sheets fed were simplex paper of different weights. The coefficient of friction for the microporous polyurethane retard member stayed essentially at 0.8 throughout the test. The coefficient of friction for the RTV-700 belt started at about 1.4, and quickly dropped to 1.3, but thereafter stayed essentially constant until 150,000 sheets had been fed. Thereafter, the coefficient of friction for the RTV-700 belt gradually dropped to about 1.2. Throughout the test, a positive "delta" between the two sheet feeding members was maintained.

It will be appreciated that the absolute values of the coefficients of friction obtained in this example cannot be validly compared with those of the other examples since the testing conditions were not the same. However, the important comparisons which may be made include the "delta" and the degradation of the coefficients within each example.

While the invention has been described in detail with reference to specific and preferred embodiments, it will be appreciated that various modifications may be made from the specific details without departing from the spirit and scope of the invention.

We claim:

1. A sheet handling device for use in an electrostatographic copying machine wherein a sheet is conveyed by frictional engagement with a handling member, said handling device comprising a handling member which comprises a silicone roller composition obtained from the functional surface of room temperature vulcanization of a room temperature vulcanizable silicone rubber composition comprising a diorganopolysiloxane, a treated filler, an organosilicate, and a curing catalyst, said treated filler being a silica filler treated with a mixture of a hydroxyl amine, a cyclic siloxane, and a silyl nitrogen compound.

2. The sheet handling device of claim 1 wherein said sheet handling device is a sheet feeding device, wherein said sheet is fed by frictional engagement with a sheet feeding member, and wherein at least the functional surface of the sheet feeding member is made of said room temperature vulcanized silicone rubber composition.

3. The sheet feeding device of claim 2 wherein said diorganopolysiloxane is a silanol-terminated dimethylpolysiloxane, wherein said organosilicate is a monomeric organosilicate or a partially hydrolyzed product of a monomeric organosilicate, and wherein said curing catalyst is a carboxylic acid salt of a metal.

4. The sheet feeding device of claim 1 wherein said diorganopolysiloxane is a silanol-terminated dimethylpolysiloxane, wherein said organosilicate is a monomeric organosilicate or a partially hydrolyzed product of a monomeric organosilicate, and wherein said curing catalyst is a carboxylic acid salt of a metal.

5. A method of feeding sheets in an electrostatographic copying machine by frictional engagement with a feeding member, comprising frictionally contacting the sheets to be fed with a surface of the feeding member comprising a silicone rubber composition obtained from the room temperature vulcanization of a room temperature vulcanizable silicone rubber composition comprising a diorganopolysiloxane containing a treated filler, an organosilicate, and a curing catalyst, said treated filler being a silica filler treated with a mixture of a hydroxyl amine, a cyclic siloxane, and a silyl nitrogen compound.

6. The method of claim 5 wherein said feeding member is in a duplex mode of operation, and wherein said surface is in frictional contact with the imaged side of a simplexed copy.

7. The method of claim 6 wherein said diorganopolysiloxane is a silanol-terminated dimethylpolysiloxane, wherein said organosilicate is a monomeric organosilicate or a partially hydrolyzed product of a monomeric organosilicate, and wherein said curing catalyst is a carboxylic acid salt of a metal.

* * * * *